(12) United States Patent
Xu

(10) Patent No.: US 11,032,596 B2
(45) Date of Patent: Jun. 8, 2021

(54) SYSTEMS AND METHODS FOR GENERATING CONTENT STREAMS

(71) Applicant: Facebook, Inc., Menlo Park, CA (US)

(72) Inventor: Chenyong Xu, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 8 days.

(21) Appl. No.: 15/859,009

(22) Filed: Dec. 29, 2017

(65) Prior Publication Data

US 2019/0208245 A1    Jul. 4, 2019

(51) Int. Cl.
| H04N 7/173 | (2011.01) |
| H04N 21/2662 | (2011.01) |
| H04N 21/24 | (2011.01) |
| H04N 21/2385 | (2011.01) |
| H04N 21/4788 | (2011.01) |
| H04N 21/2668 | (2011.01) |
| H04N 21/258 | (2011.01) |
| H04N 21/2343 | (2011.01) |
| G06Q 50/00 | (2012.01) |

(52) U.S. Cl.
CPC ..... *H04N 21/2662* (2013.01); *H04N 21/2385* (2013.01); *H04N 21/23439* (2013.01); *H04N 21/2402* (2013.01); *H04N 21/25808* (2013.01); *H04N 21/2668* (2013.01); *H04N 21/4788* (2013.01); *G06Q 50/01* (2013.01)

(58) Field of Classification Search
CPC . H04N 21/2662; H04N 21/2402; G06Q 50/01
See application file for complete search history.

(56) References Cited

U.S. PATENT DOCUMENTS

| 9,521,178 | B1* | 12/2016 | Gigliotti | H04L 65/602 |
| 2009/0257447 | A1* | 10/2009 | Karlsson | H04L 47/10 |
| | | | | 370/468 |
| 2016/0100162 | A1* | 4/2016 | Reisner | H04N 19/115 |
| | | | | 375/240.02 |
| 2017/0272790 | A1* | 9/2017 | Miles | H04N 21/23439 |
| 2018/0006838 | A1* | 1/2018 | Lewis | H04L 67/306 |
| 2018/0109819 | A1* | 4/2018 | Lu | H04N 21/2387 |

OTHER PUBLICATIONS

Maxima and Minima of Functions, www.mathsisfun.com/algebra/functions-maxima-minima.html, Dec. 7, 2016, pp. 1-2 (Year: 2016).*

* cited by examiner

*Primary Examiner* — Kyu Chae
(74) *Attorney, Agent, or Firm* — Sheppard Mullin Richter & Hampton LLP

(57) ABSTRACT

Systems, methods, and non-transitory computer-readable media can determine a viewing audience for a content producer. A bandwidth distribution for the viewing audience can be determined. One or more quality levels for encoding streams of content items created by the content producer can be determined based at least in part on the bandwidth distribution.

17 Claims, 8 Drawing Sheets

SYSTEMS AND METHODS FOR GENERATING CONTENT STREAMS

FIELD OF THE INVENTION

The present technology relates to the field of content provision. More particularly, the present technology relates to techniques for generating content streams in a computerized networking system.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the content sharing platform. Typically, the content items can be provided, or uploaded, by various entities including, for example, content publishers and also users of the content sharing platform. In some instances, the content items can be categorized and/or curated.

SUMMARY

Various embodiments of the present disclosure can include systems, methods, and non-transitory computer readable media configured to determine a viewing audience for a content producer. A bandwidth distribution for the viewing audience can be determined. One or more quality levels for encoding streams of content items created by the content producer can be determined based at least in part on the bandwidth distribution.

In some embodiments, the viewing audience comprises users of a social networking system that are following the content producer through the social networking system.

In some embodiments, the viewing audience comprises users of a social networking system that accessed at least one content item previously posted by the content producer.

In some embodiments, the bandwidth distribution plots respective bandwidth capabilities of users included in the viewing audience.

In some embodiments, the quality levels are determined based on bandwidth capabilities of users corresponding to one or more percentiles in the bandwidth distribution.

In some embodiments, the quality levels are determined based on bandwidth capabilities of users corresponding to one or more peaks in the bandwidth distribution.

In some embodiments, the peaks correspond to at least a global maximum, one or more local maximums, or both.

In some embodiments, the systems, methods, and non-transitory computer readable media are configured to encode at least one stream of at least one content item created by the content producer based at least in part on the determined quality levels.

In some embodiments, the quality levels are stored for encoding streams of additional content items that are created by the content producer.

In some embodiments, the systems, methods, and non-transitory computer readable media are configured to determine an updated viewing audience for the content producer; update the bandwidth distribution for the viewing audience; and determine one or more updated quality levels for encoding streams of content items created by the content producer based at least in part on the updated bandwidth distribution.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
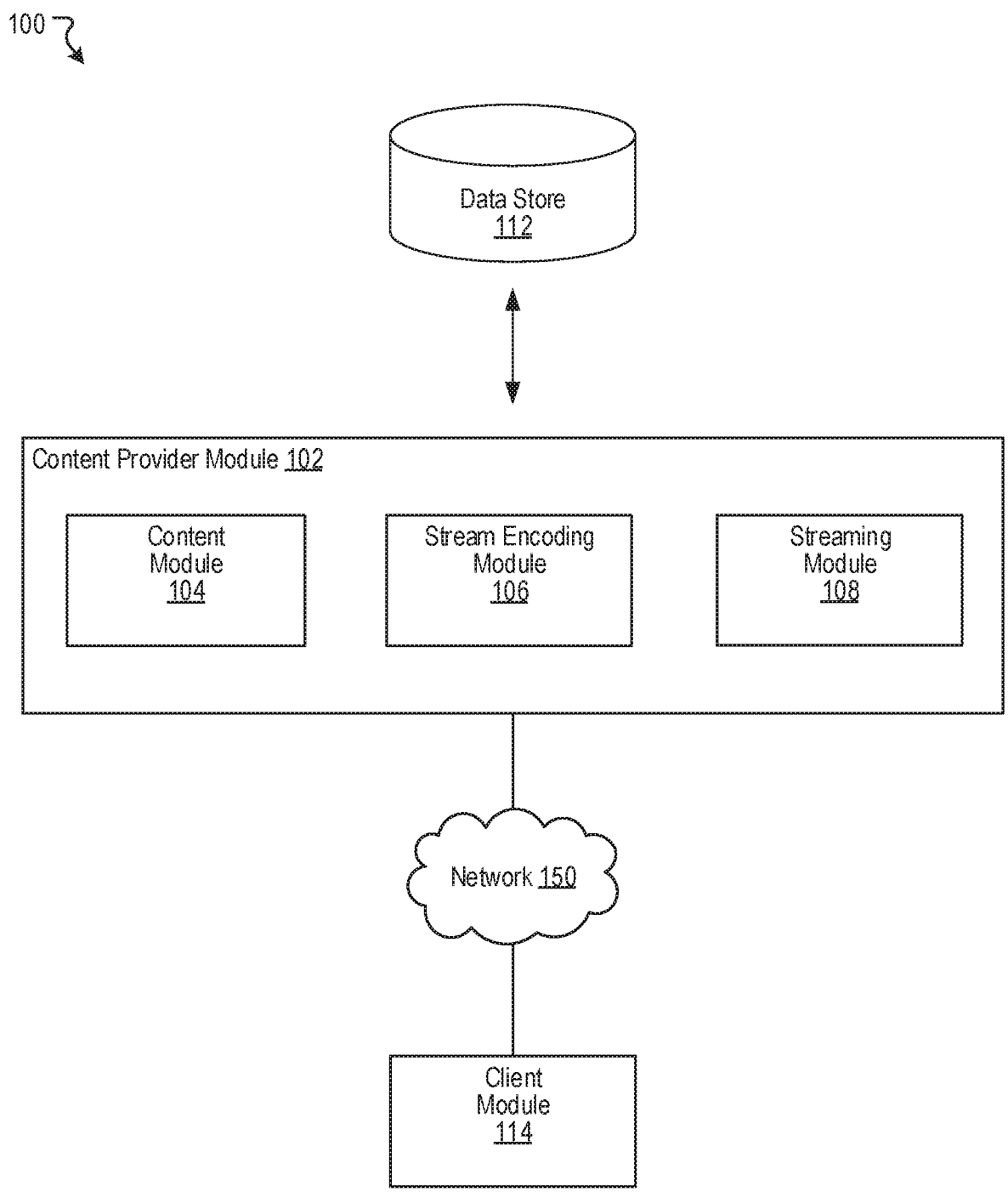
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Generating Content Streams

People use computing devices (or systems) for a wide variety of purposes. A user can operate a computing device to stream content items (e.g., audio and/or video data) over a network (e.g., Internet). Streaming a content item typically involves delivering data corresponding to the content item over a network from a content provider to a computing device. As the content item is being streamed (or downloaded), a software application (e.g., content player) running on the computing device can be used to decode and present the content item, for example, through a display screen of the computing device and/or by playing audio content corresponding to the content item.

Under conventional approaches, a content item may be accessed using multiple streams that each have a different bit rate (e.g., a high quality stream, medium quality stream, low quality stream, etc.). Each stream can be partitioned into segments that each correspond to some portion of the stream (e.g., 1-second segments, 2-second segments, 10-second segments, etc.). A computing device that requests streaming of the content item can be made aware of the multiple streams that are available for streaming the content item. Initially, the computing device may request streaming of segments from a medium quality stream corresponding to the content item. While accessing the medium quality stream, if the computing device determines that there is enough bandwidth (or download speed) to stream content at a higher quality, then the computing device can request subsequent segments from a higher quality stream corresponding to the content item. Similarly, if the computing device determines that there is not enough bandwidth to stream content at medium quality, then the computing device can request segments from a lower quality stream corresponding to the content item. In some instances, bit rates at which the multiple streams are encoded can be pre-defined. For example, a content item may be associated with a low quality stream encoded at 100 kbps, a medium quality stream encoded at 500 kbps, and a high quality stream encoded at 2000 kbps. However, encoding streams of content items based on arbitrary bit rates can result in an inefficient use of viewer bandwidth capabilities. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, multiple streams can be generated for a content item. Each stream can be used to playback the entirety of the content item. Further, each stream can be encoded at a different bit rate (e.g., a high quality stream, medium quality stream, low quality stream, etc.). In various embodiments, stream bit rates can be determined individually for each content producer (or broadcaster) of content items. For example, in some embodiments, individual bandwidth capabilities of viewers that accessed a given content producer's content item can be determined. A bandwidth distribution of these capabilities can be generated. In some embodiments, the bandwidth distribution can be used to determine bit rates for encoding streams corresponding to the content item. For example, viewer bandwidth capabilities corresponding to the $25^{th}$ percentile (e.g., p25), the $50^{th}$ percentile (e.g., p50), the $75^{th}$ percentile (e.g., p75), and the $90^{th}$ percentile (e.g., p90) can be determined from the distribution. The bandwidth capability at p25 may correspond to 200 kbps while bandwidth capabilities at p50, p75, and p90 may correspond to 500 kbps, 1000 kbps, and 1500 kbps, respectively. In this example, a first stream of the content item can be encoded at 200 kbps, a second stream at 500 kbps, a third stream at 1000 kbps, and a fourth stream at 1500 kbps. As a result, content created by the content producer can be encoded at bit rates that reflect the respective bandwidth capabilities of the content producer's viewing audience. Many variations are possible.

FIG. 1 illustrates an example system 100 including an example content provider module 102, according to an embodiment of the present disclosure. As shown in the example of FIG. 1, the content provider module 102 can include a content module 104, a stream encoding module 106, and a streaming module 108. In some instances, the example system 100 can include at least one data store 112. A client module 114 can interact with the content provider module 102 over one or more networks 150 (e.g., the Internet, a local area network, etc.). The client module 114 can be implemented in a software application running on a computing device. In various embodiments, the network 150 can be any wired or wireless computer network through which devices can exchange data. For example, the network 150 can be a personal area network, a local area network, or a wide area network, to name some examples. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. In some instances, the content provider module 102 can be, in part or in whole, implemented within or configured to operate in conjunction or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing some, or all, functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

In some embodiments, the content provider module 102 can be configured to communicate and/or operate with the at least one data store 112 in the example system 100. The at least one data store 112 can be configured to store and maintain various types of data. In various embodiments, the at least one data store 112 can store data relevant to function and operation of the content provider module 102. One example of such data can be content items that are available for access (e.g., streaming). In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data. It should be appreciated that there can be many variations or other possibilities.

In various embodiments, the content module 104 can provide access to various types of content items to be presented through an interface. This interface may be provided through a display of a computing device in which the client module 114 is implemented, for example. In some instances, the computing device may be running a software application (e.g., social networking application) that is configured to present content items. In some embodiments, multiple streams having different bit rates (e.g., high quality stream, medium quality stream, low quality stream, etc.) can be generated for each of these content items using the approaches described herein. The computing device can utilize any of the multiple streams to present the content item. For example, the computing device can automatically select one of the multiple streams based on the computing device's bandwidth capability (e.g., download speed).

In some embodiments, the stream encoding module 106 can generate respective streams for content items. In various embodiments, the stream encoding module 106 can determine quality levels (or bit rates) at which streams of a given content item will be encoded. More details describing the stream encoding module 106 will be provided below in reference to FIG. 2A.

The streaming module 108 can be configured to send, or transmit, data corresponding to portions of any content item that is requested, for example, by the client module 114. The streaming module 108 can utilize generally known approaches and protocols for streaming content including, for example, the HyperText Transfer Protocol (HTTP) or the Real-time Streaming Protocol (RTSP), to name some examples. The client module 114 can present the content received from the streaming module 108. More details describing the client module 114 will be provided below in reference to FIG. 3.

Figure 2A:
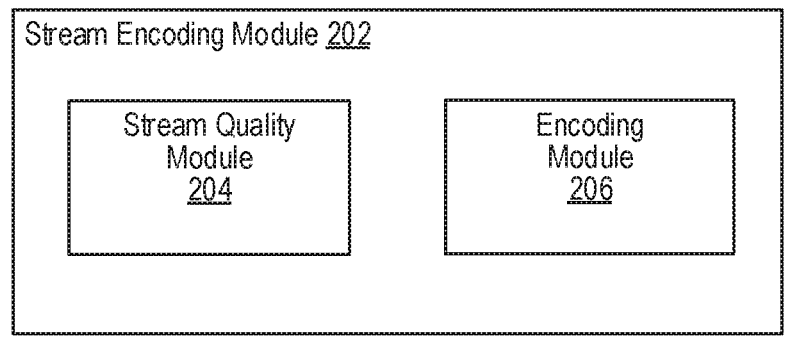
FIG. 2A illustrates an example of a stream encoding module, according to an embodiment of the present disclosure.

FIG. 2A illustrates an example of a stream encoding module 202, according to an embodiment of the present disclosure. In some embodiments, the stream encoding module 106 of FIG. 1 can be implemented with the stream encoding module 202. As shown in the example of FIG. 2A, the stream encoding module 202 can include a stream quality module 204 and an encoding module 206.

The stream quality module 204 can be configured to determine respective quality levels (e.g., bit rates) for a set of streams to be generated for a content item. For example, a content item may have a first stream that corresponds to a first quality level, a second stream that corresponds to a second quality level, and a third stream that corresponds to a third quality level. A computing device can adaptively stream the content item using the first stream, the second stream, or the third stream based on its bandwidth capability. More details describing the stream quality module 204 will be provided below in reference to FIG. 2B.

The encoding module 206 can be configured to encode content data into some digital format that can be presented by a software application (e.g., social networking application, content player, etc.). In general, the encoding module 206 can be configured to encode video content using generally known video codecs, such as the H.264 or MPEG-4 video formats. Further, the encoding module 206 can be configured to encode audio content using generally known audio codecs, such as the MPEG-1 or MPEG-2 Audio Layer III (MP3) audio formats. In some embodiments, when encoding a content item, the encoding module 206 generates multiple streams for the content item with each stream having a different quality level. For example, for a given content item, the encoding module 206 can generate a first stream at a first bit rate, a second stream at a second bit rate, and a third stream at a third bit rate. In general, each stream can be used to playback the entirety of the content item at its respective bit rate. The respective bit rates (or quality levels) used to encode the different streams can be determined by the stream quality module 204.

Figure 2B:
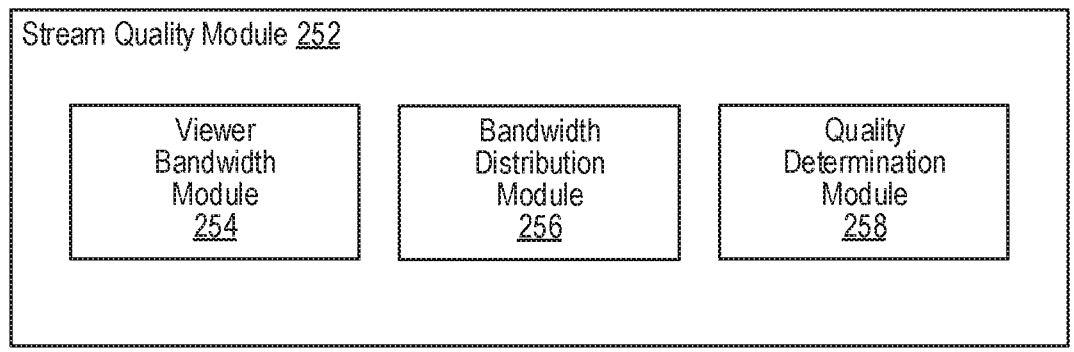
FIG. 2B illustrates an example of a stream quality module, according to an embodiment of the present disclosure.

FIG. 2B illustrates an example of a stream quality module 252, according to an embodiment of the present disclosure. In some embodiments, the stream quality module 204 of FIG. 2A can be implemented with the stream quality module 252. As shown in the example of FIG. 2B, the stream quality module 252 can include a viewer bandwidth module 254, a bandwidth distribution module 256, and a quality determination module 258.

The stream quality module 252 can be configured to determine respective quality levels (e.g., bit rates) for streams to be generated for content items. In various embodiments, such quality levels can be determined individually for each content producer (or broadcaster) of content items based on the respective bandwidth capabilities of their viewing audience. For example, the stream quality module 252 can determine that a content item created by a first content producer should have a first stream encoded at 500 kbps and a second stream encoded at 1500 kbps based on bandwidth capabilities of the first content producer's viewing audience. In contrast, the stream quality module 252 can determine that a content item created by a second content producer should have a first stream encoded at 1000 kbps and a second stream encoded at 3000 kbps based on bandwidth capabilities of the second content producer's viewing audience. Many variations are possible.

In some embodiments, when determining stream quality levels for a given content producer, the viewer bandwidth module 254 can identify users (e.g., viewers) that accessed one or more content items published by the content producer through a content provider (e.g., social networking system). For example, the viewer bandwidth module 254 can identify a video that was published by the content producer through the content provider. The viewer bandwidth module 254 can identify users (e.g., viewers) that accessed the video over some period of time. For example, the viewer bandwidth module 254 can identify users that viewed the video during a given month. In some embodiments, the viewer bandwidth module 254 can determine bandwidth capabilities (e.g., download speeds) for each of the identified users. In general, viewer bandwidth capabilities may be determined using generally known approaches. In some embodiments, viewer bandwidth capabilities may be determined by the content provider from which the video is streamed using generally known techniques. In some embodiments, viewer computing devices being used to stream the video can each determine and provide their respective bandwidth capabilities to the content provider. For example, a computing device being used to stream the video can determine a running rate at which the video is being streamed (e.g., 500 kbps). In this example, the computing device can communicate this information to the content provider. In various embodiments, the content provider can store and manage such information. Many variations are possible. For example, in some embodiments, when determining stream quality levels for a given content producer, the viewer bandwidth module 254 can identify users that are friends (or followers) of the content producer through the content provider (e.g., social networking system). The viewer bandwidth module 254 can then determine the respective bandwidth capabilities for each of the identified users as described above.

Figure 4:
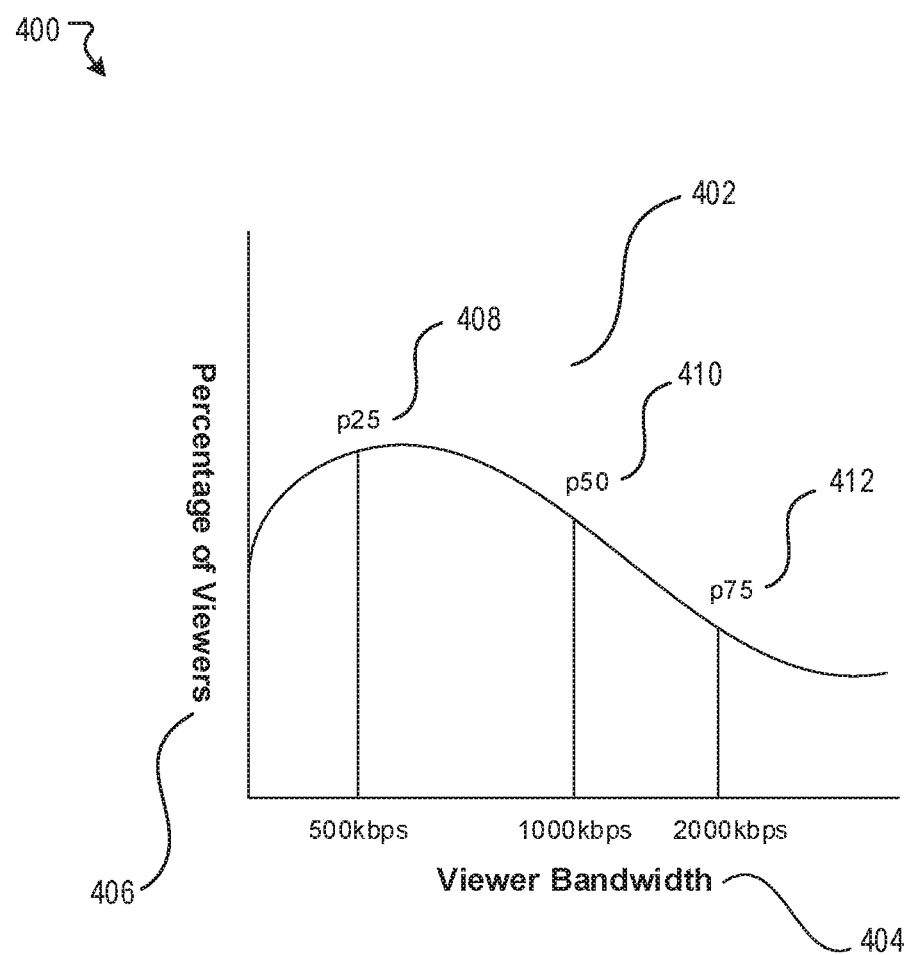
FIG. 4 illustrates an example bandwidth distribution, according to an embodiment of the present disclosure.

The bandwidth distribution module 256 can generate bandwidth distributions based on viewer bandwidth capabilities. For example, the bandwidth distribution module 256 can determine a bandwidth distribution based on bandwidth capabilities of a set of identified users, as determined by the viewer bandwidth module 254. In some embodiments, the bandwidth distribution can plot bandwidth capabilities of the identified users, as illustrated in the example of FIG. 4. For example, the bandwidth distribution can include an x-axis that corresponds to viewer bandwidth capability (e.g., downstream speed) and a y-axis that corresponds to a number (or percentage) of users. As a result, the bandwidth distribution can indicate bandwidth capabilities of users that have accessed content produced by a content producer or users (e.g., friends, followers, etc.) that are expected to access content produced by the content producer.

The quality determination module 258 can determine stream quality levels to be applied to content items associated with a content producer. For example, the determined stream quality levels can be used to encode (or re-encode) streams corresponding to content items created by the content producer. In some embodiments, the quality determination module 258 determines stream quality levels based on a bandwidth distribution, as determined by the bandwidth distribution module 256. In such embodiments, the quality determination module 258 can identify viewer bandwidth capabilities that correspond to one or more pre-defined percentiles. For example, the quality determination module 258 can determine viewer bandwidth capabilities at the 25th percentile (e.g., p25), the 50th percentile (e.g., p50), and the 90th percentile (e.g., p90) from the bandwidth distribution. In this example, the bandwidth capability at p25 may correspond to 300 kbps while bandwidth capabilities at p50 and p90 may correspond to 500 kbps and 1500 kbps, respectively. Accordingly, a first stream corresponding to the content item can be encoded at 300 kbps, a second stream at 500 kbps, and a third stream at 1500 kbps. In general, additional or fewer streams may be generated depending on the implementation. In some embodiments, the quality determination module 258 determines stream quality levels based on one or more peaks in a bandwidth distribution. In general, peaks in a bandwidth distribution may be identified based on a global maximum and/or one or more local maximums. For example, a bandwidth distribution may have a first local maximum that corresponds to a 600 kbps bandwidth capability and a second local maximum that corresponds to a 1200 kbps bandwidth capability. In this example, a first stream may be encoded at 600 kbps based on the first local maximum and a second stream may be encoded at 1200 kbps based on the second local maximum. Many variations are possible.

Figure 3:
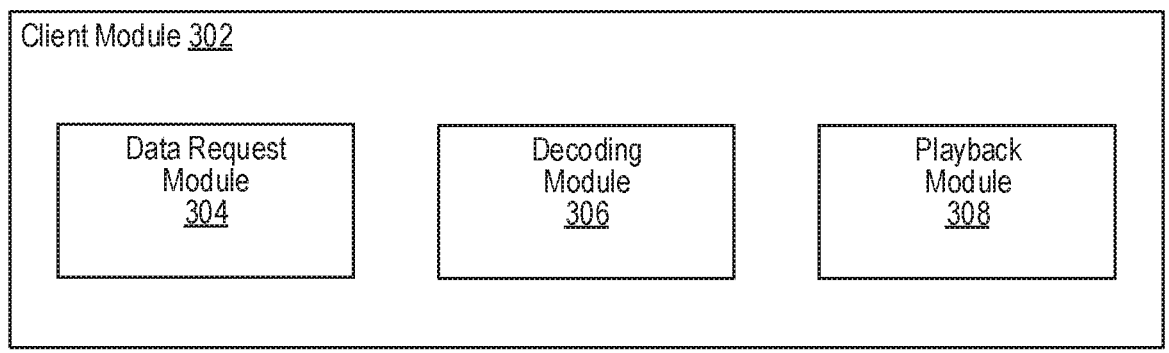
FIG. 3 illustrates an example of a client module, according to an embodiment of the present disclosure.

FIG. 3 illustrates an example client module 302, according to an embodiment of the present disclosure. In some embodiments, the client module 114 of FIG. 1 can be implemented with the client module 302. As shown in the example of FIG. 3, the client module 302 can include a data request module 304, a decoding module 306, and a playback module 308. In some embodiments, the client module 302 is implemented in a computing device (e.g., the user device 610 of FIG. 6).

In some embodiments, the data request module 304 can be configured to obtain data corresponding to content items being streamed from a content provider. For example, when accessing a content item, the data request module 304 can request a stream corresponding to the content item. The requested stream can be encoded at some quality level (e.g., bit rate) that can be accommodated by the computing device in which the client module 302 is implemented. In various embodiments, the data request module 304 can be configured to adaptively select a stream being used to access a content item based on the amount of bandwidth that is available. For example, the computing device in which the client module 302 is implemented can access a content item for which multiple streams have been generated at different quality levels (e.g., bit rates). In this example, the computing device may initially request a medium quality stream. When accessing the medium quality stream, the computing device can obtain and present segments (e.g., key frame segments, inter frame segments, P-frames, B-frames, etc.) corresponding to the medium quality stream. In this example, if the computing device determines that there is not enough bandwidth to stream the medium quality stream, the computing device can request and present segments from a lower quality stream corresponding to the content item. At some point during the playback, the computing device may determine that there is enough bandwidth to stream the content item using a high quality stream. In this example, the computing device can obtain and present segments corresponding to the high quality stream. In some embodiments, this switching between the different quality streams corresponding to the content item can continue periodically (e.g., at specified time intervals) as the content item is streamed.

As mentioned, the data request module 304 can determine the amount of bandwidth available to the client module 302. In some embodiments, the data request module 304 determines the amount of bandwidth available by determining a running rate (e.g., bits per second) of a stream. This running rate can be computed by dividing the amount of data (e.g., number of bits) corresponding to the stream that has already been received by the duration of time over which the content has been streamed. Thus, for example, if 500 kilobits of a stream have been received over a duration of five seconds, then the running rate is 100 kilobits per second (or kbps). Depending on the implementation, the data request module 304 can be configured to periodically determine the running rate of a stream at specified time intervals and/or when a call, or instruction, is received from the client module 302. The data request module 304 can also be configured to determine a source rate at which the stream was encoded. In some instances, the data request module 304 may receive (or obtain) information describing the source rate for the stream from the content provider. In various embodiments, the running rate can be evaluated with respect to the source rate to gauge the amount of bandwidth that is available to the computing device.

The decoding module 306 can be configured to decode the received content data (e.g., segments) so that encoded content can be presented through a display screen of the computing device. As mentioned, content data can be encoded before being sent or transmitted. Once content data is received by the client module 302, the decoding module 306 can decode the content data, for example, by determining the format, or codec, used to encode the content data and using that information to decode the content data. The decoding process can be performed as the content data is being streamed to the client module 302.

The playback module 308 can be configured to present the decoded content as the content is received. For example, the playback module 308 can be configured to play video content through the display screen of the computing device. The playback module 308 can also be configured to play audio content through an audio output source of the computing device.

FIG. 4 illustrates an example 400 of a bandwidth distribution 402. In this example, the bandwidth distribution 402 plots viewer bandwidth capabilities for a given content producer. As shown in FIG. 4, the bandwidth distribution 402 can include an x-axis 404 that corresponds to viewer bandwidth capability (e.g., downstream speed) and a y-axis 406 that corresponds to a number (or percentage) of users having a given bandwidth capability. Thus, the bandwidth distribution 402 can indicate bandwidth capabilities of the content producer's viewing audience. In some embodiments, the bandwidth distribution 402 can be used to determine quality levels (e.g., bit rates) at which content items associated with the content producer can be encoded. In the example of FIG. 4, viewer bandwidth capabilities at the 25th percentile 408 (e.g., p25), the 50th percentile 410 (e.g., p50), and the 75th percentile 412 (e.g., p75) correspond to 500 kbps, 1000 kbps, and 2000 kbps, respectively. In some embodiments, these bandwidth capabilities can be stored and used to encode streams for content items created and/or published by the content producer. In some embodiments, the bandwidth distribution 402 can be updated over time to accommodate changes to the content producer's viewing audience. For example, the bandwidth distribution 402 can be updated every month using the approaches described above so that bandwidth capabilities of the viewing audience are accurately reflected.

Figure 5:
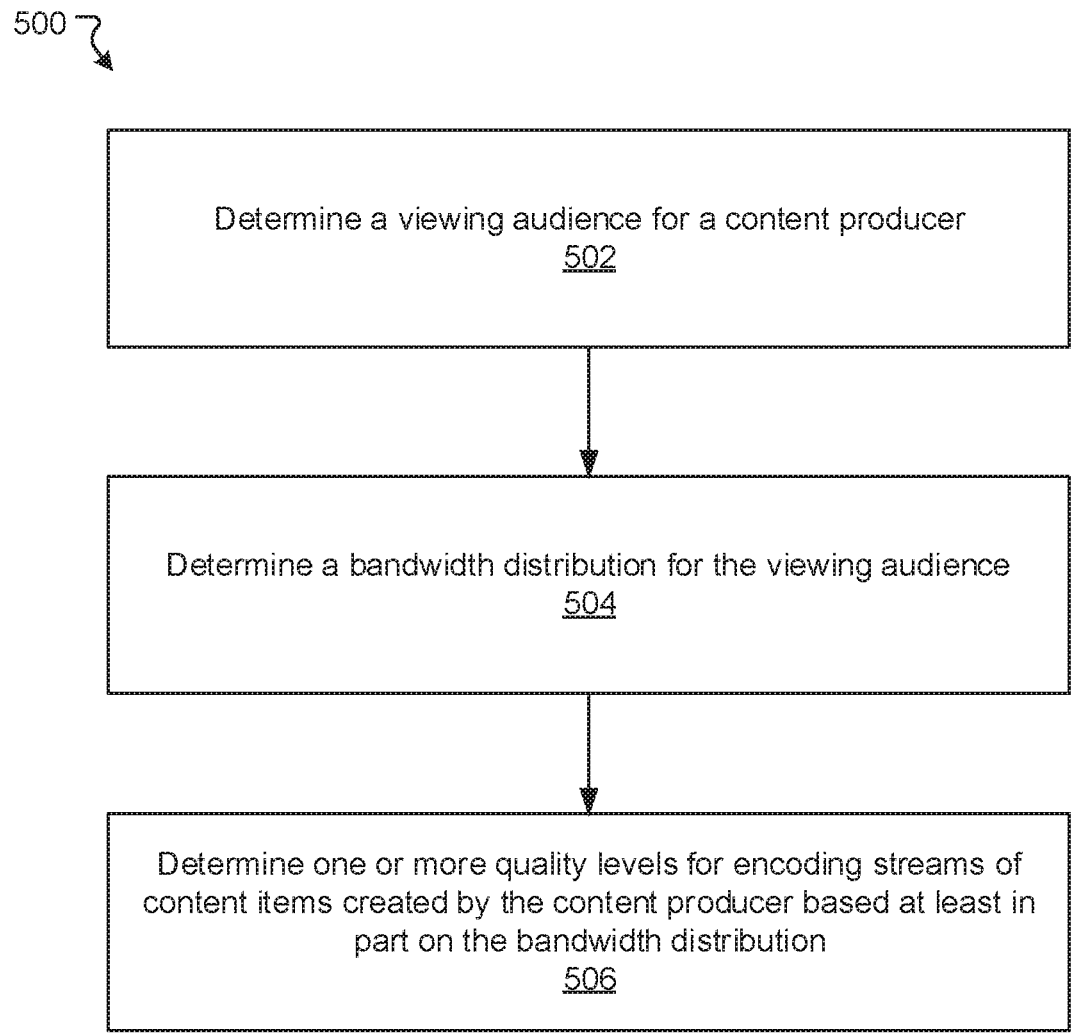
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a viewing audience for a content producer can be determined. At block 504, a bandwidth distribution for the viewing audience can be determined. At block 506, one or more quality levels for encoding streams of content items created by the content producer can be determined based at least in part on the bandwidth distribution.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
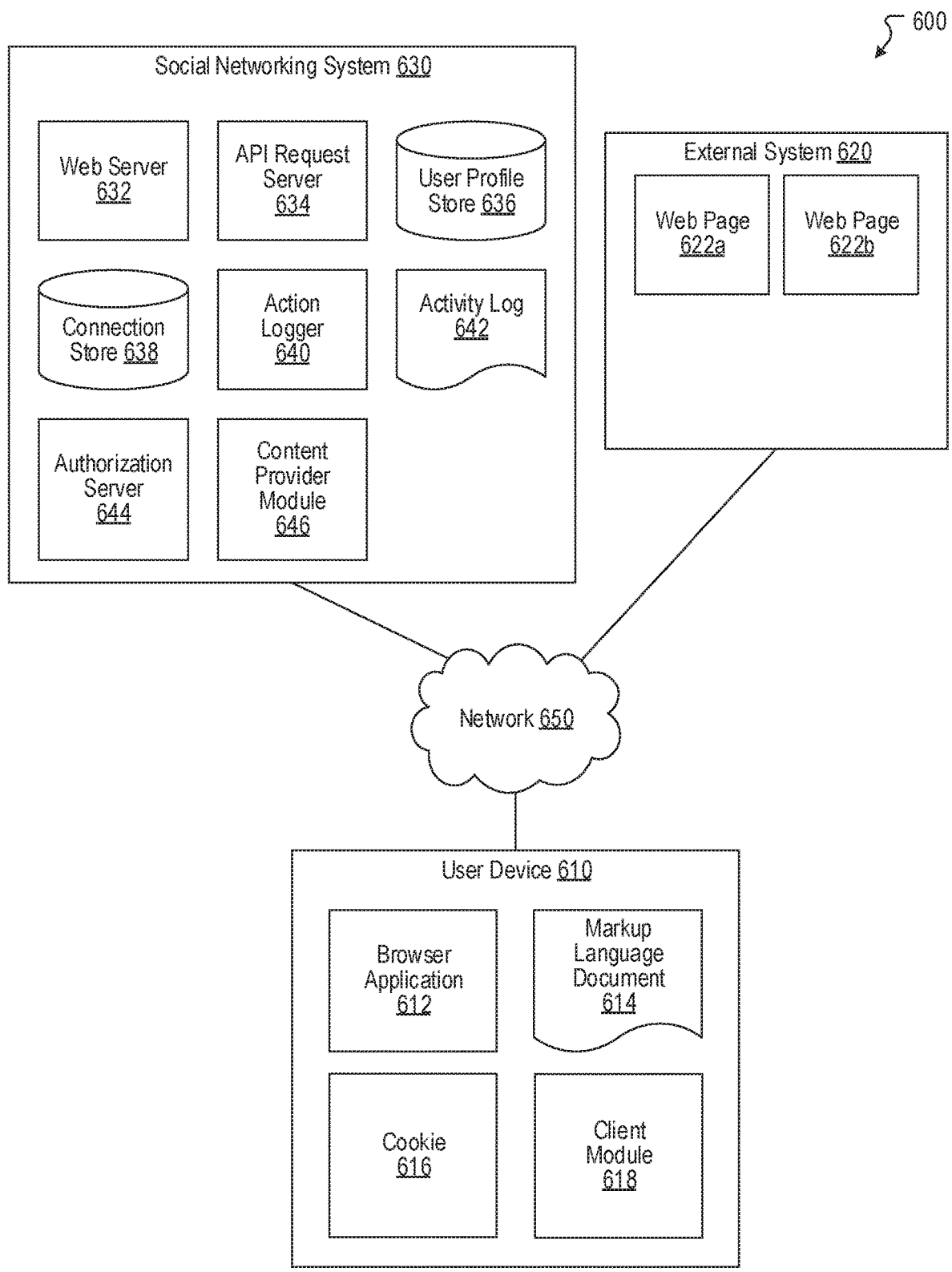
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the content provider module 646, or some of its features, can be implemented in a computing device, e.g., the user device 610. In some embodiments, the user device 610 can include a client module 618. The client module 618 can, for example, be implemented as the client module 114 of FIG. 1. As discussed previously, it should be appreciated that there can be many variations or other possibilities.

Hardware Implementation

Figure 7:
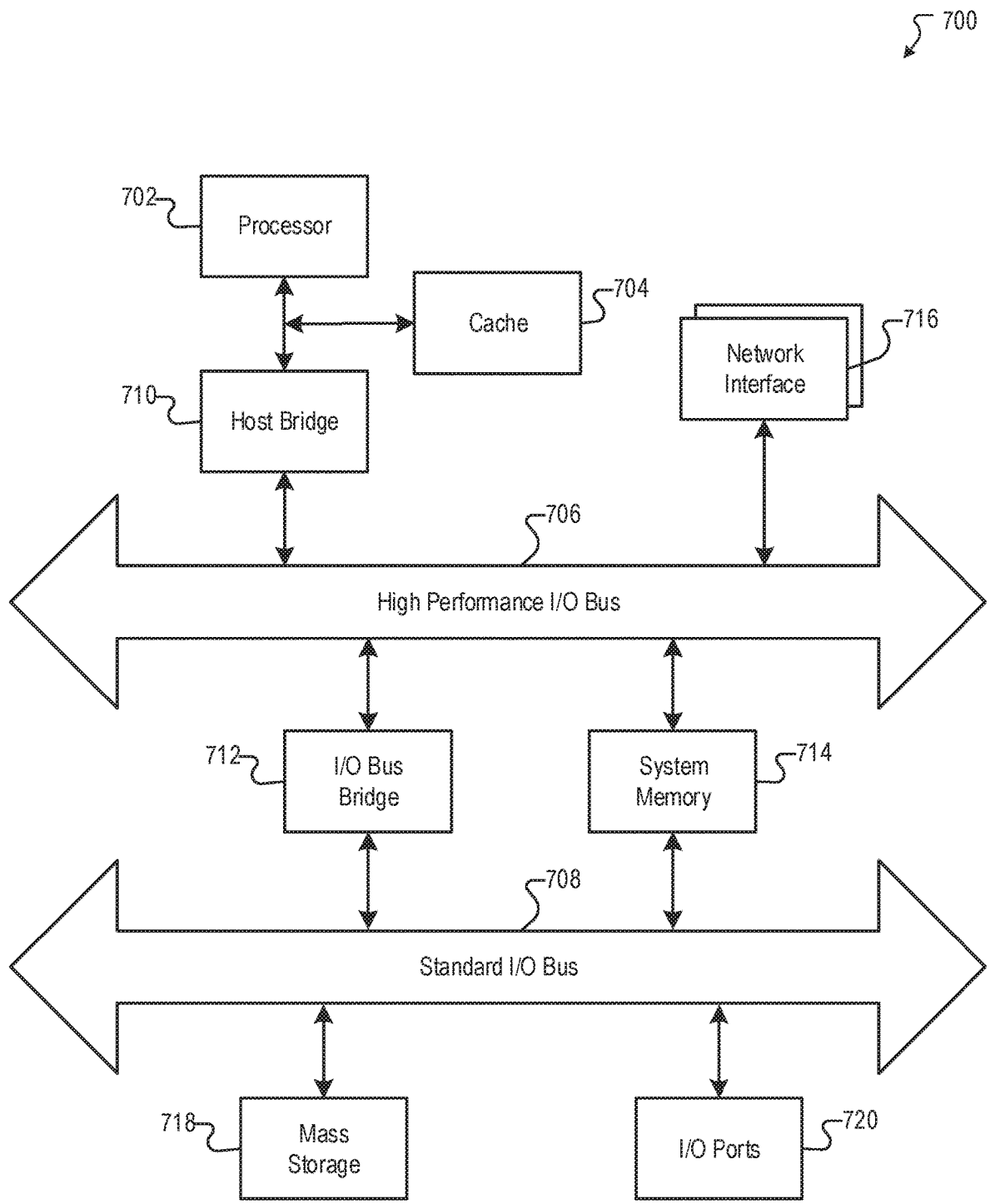
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, first bandwidth capabilities of a first viewing audience for a first content producer on a system, wherein the first viewing audience comprises users of the system that are following the first content producer through the system;
    constructing, by the computing system, a first bandwidth distribution that plots the first bandwidth capabilities of the first viewing audience for the first content producer;
    determining, by the computing system, one or more first quality levels for encoding streams of content items created by the first content producer based at least in part on the first bandwidth distribution, wherein the one or more first quality levels correspond to one or more peaks in the first bandwidth distribution, wherein the one or more peaks include at least a global maximum and one or more local maxima, and wherein a number of streams to be encoded corresponds with a number of peaks in the first bandwidth distribution;
    updating, by the computing system, the first bandwidth distribution for the first viewing audience for the first content producer to accommodate changes to the first viewing audience over time;
    encoding, by the computing system, at least one stream of at least one content item created by the first content producer based at least in part on the one or more determined first quality levels;
    determining, by the computing system, second bandwidth capabilities of a second viewing audience for a second content producer on the system, wherein the second bandwidth capabilities of the second viewing audience are different from the bandwidth capabilities of the viewing audience;
    constructing, by the computing system, a second bandwidth distribution that plots the second bandwidth capabilities of the second viewing audience for the second content producer;
    determining, by the computing system, one or more second quality levels for encoding streams of content items created by the second content producer; and
    encoding, by the computing system, at least one stream of at least one content item created by the second content producer based on the one or more determined second quality levels.

2. The computer-implemented method of claim 1, wherein the first viewing audience comprises users of the system that accessed at least one content item previously posted by the first content producer.

3. The computer-implemented method of claim 1, wherein the one or more first quality levels are based on bandwidth capabilities of users corresponding to one or more percentiles in the first bandwidth distribution.

4. The computer-implemented method of claim 1, wherein the one or more first quality levels are stored for encoding streams of additional content items that are created by the first content producer.

5. The computer-implemented method of claim 1, the method further comprising:
    determining, by the computing system, an updated viewing audience for the first content producer; and
    determining, by the computing system, one or more updated quality levels for encoding streams of content items created by the first content producer based at least in part on the updated bandwidth distribution.

6. The computer-implemented method of claim 1, wherein the bandwidth capabilities of the first viewing audience are determined based at least in part on an amount of data corresponding to a stream of a content item created by the first content producer that was received and a duration of time over which the data was received.

7. The computer-implemented method of claim 1, wherein the bandwidth capabilities of the first viewing audience are determined based at least in part on a source rate at which a stream of a content item created by the first content producer that was received was encoded.

8. A computing system comprising:
   at least one processor; and
   a memory storing instructions that, when executed by the at least one processor, cause the computing system to perform:
      determining first bandwidth capabilities of a first viewing audience for a first content producer on a system, wherein the viewing audience comprises users of the system that are following the content producer through the system;
      constructing a first bandwidth distribution that plots the first bandwidth capabilities of the first viewing audience for the first content producer;
      determining one or more first quality levels for encoding streams of content items created by the first content producer based at least in part on the first bandwidth distribution, wherein the one or more first quality levels correspond to one or more peaks in the first bandwidth distribution, wherein the one or more peaks include at least a global maximum and one or more local maxima, and wherein a number of streams to be encoded corresponds with a number of peaks in the first bandwidth distribution;
      updating the first bandwidth distribution for the first viewing audience for the first content producer to accommodate changes to the first viewing audience over time;
      encoding at least one stream of at least one content item created by the first content producer based at least in part on the one or more determined first quality levels;
      determining second bandwidth capabilities of a second viewing audience for a second content producer on the system, wherein the second bandwidth capabilities of the second viewing audience are different from the bandwidth capabilities of the viewing audience;
      constructing a second bandwidth distribution that plots the second bandwidth capabilities of the second viewing audience for the second content producer;
      determining one or more second quality levels for encoding streams of content items created by the second content producer; and
      encoding at least one stream of at least one content item created by the second content producer based on the one or more determined second quality levels.

9. The system of claim 8, wherein the first viewing audience comprises users of the system that accessed at least one content item previously posted by the first content producer.

10. The system of claim 8, wherein the one or more first quality levels are determined based on bandwidth capabilities of users corresponding to one or more percentiles in the first bandwidth distribution.

11. The computing system of claim 8, wherein the one or more first quality levels are stored for encoding streams of additional content items that are created by the first content producer.

12. The computing system of claim 8, wherein the at least one processor causes the computing system to further perform:
   determining an updated viewing audience for the first content producer; and
   determining one or more updated quality levels for encoding streams of content items created by the first content producer based at least in part on the updated bandwidth distribution.

13. A non-transitory computer-readable storage medium including instructions that, when executed by at least one processor of a computing system, cause the computing system to perform a method comprising:
   determining first bandwidth capabilities of a first viewing audience for a first content producer on a system, wherein the first viewing audience comprises users of the system that are following the first content producer through the system;
   constructing a first bandwidth distribution that plots the first bandwidth capabilities of the first viewing audience for the first content producer;
   determining one or more first quality levels for encoding streams of content items created by the first content producer based at least in part on the first bandwidth distribution, wherein the one or more first quality levels correspond to one or more peaks in the first bandwidth distribution, wherein the one or more peaks include at least a global maximum and one or more local maxima, and wherein a number of streams to be encoded corresponds with a number of peaks in the first bandwidth distribution;
   updating the first bandwidth distribution for the first viewing audience for the first content producer to accommodate changes to the first viewing audience over time;
   encoding at least one stream of at least one content item created by the first content producer based at least in part on the one or more determined first quality levels;
   determining second bandwidth capabilities of a second viewing audience for a second content producer on the system, wherein the second bandwidth capabilities of the second viewing audience are different from the bandwidth capabilities of the viewing audience;
   constructing a second bandwidth distribution that plots the second bandwidth capabilities of the second viewing audience for the second content producer;
   determining one or more second quality levels for encoding streams of content items created by the second content producer; and
   encoding at least one stream of at least one content item created by the second content producer based on the one or more determined second quality levels.

14. The non-transitory computer-readable storage medium of claim 13, wherein the first viewing audience comprises users of the system that accessed at least one content item previously posted by the first content producer.

15. The non-transitory computer-readable storage medium of claim 13, wherein the one or more first quality levels are determined based on bandwidth capabilities of users corresponding to one or more percentiles in the first bandwidth distribution.

16. The non-transitory computer-readable storage medium of claim 13, wherein the one or more first quality levels are stored for encoding streams of additional content items that are created by the first content producer.

17. The non-transitory computer-readable storage medium of claim 13, wherein the instructions, when executed by the at least one processor of the computing system, cause the computing system to further perform:
  determining an updated viewing audience for the first content producer; and
  determining one or more updated quality levels for encoding streams of content items created by the first content producer based at least in part on the updated bandwidth distribution.

* * * * *